(12) United States Patent
Baertsch et al.

(10) Patent No.: US 11,447,018 B2
(45) Date of Patent: Sep. 20, 2022

(54) PATH CORRECTION OF A VEHICLE RELATIVE TO PROJECTED MAGNETIC FLIGHT PATH

(71) Applicant: SKYTRAN, INC., Moffett Field, CA (US)

(72) Inventors: Robert Baertsch, Santa Cruz, CA (US); John Lee Wamble, III, Kenmore, WA (US); John Cole, Dana Point, CA (US); Clark B. Foster, Mission Viejo, CA (US)

(73) Assignee: SKYTRAN, INC., Huntington Beach, CA (US)

( * ) Notice: Subject to any disclaimer, the term of this patent is extended or adjusted under 35 U.S.C. 154(b) by 23 days.

(21) Appl. No.: 16/606,718

(22) PCT Filed: Apr. 18, 2018

(86) PCT No.: PCT/US2018/028187
§ 371 (c)(1),
(2) Date: Oct. 18, 2019

(87) PCT Pub. No.: WO2018/195213
PCT Pub. Date: Oct. 25, 2018

(65) Prior Publication Data
US 2020/0130514 A1 Apr. 30, 2020

Related U.S. Application Data
(60) Provisional application No. 62/486,860, filed on Apr. 18, 2017.

(51) Int. Cl.
*B60L 13/08* (2006.01)
(52) U.S. Cl.
CPC ................... *B60L 13/08* (2013.01)

(58) Field of Classification Search
CPC .......... B60L 13/04; B60L 13/06; B60L 13/08; B60L 13/10; B60L 2240/22;
(Continued)

(56) References Cited

U.S. PATENT DOCUMENTS

| 4,967,670 A | 11/1990 | Morishita et al. |
| 5,904,101 A * | 5/1999 | Kuznetsov .............. B60L 13/10 104/281 |

(Continued)

FOREIGN PATENT DOCUMENTS

| CN | 101692315 B * | 8/2011 |
| EP | 2933132 A | 10/2015 |

(Continued)

OTHER PUBLICATIONS

International Search Report and Written Opinion from the International Searching Authority, dated Jul. 9, 2018, 9 pages, for the corresponding International Application PCT/US2018/028187.

(Continued)

*Primary Examiner* — Hunter B Lonsberry
*Assistant Examiner* — Daniel L Greene
(74) *Attorney, Agent, or Firm* — Polsinelli PC

(57) ABSTRACT

Disclosed herein are techniques for guiding a vehicle over a flight path. The techniques include receiving guideway data, such as information corresponding to a track segment, generated by one or more guideway sensors associated with a metallic track, and receiving flight path data, such as a set of 3-D space coordinates for the vehicle. The method further includes determining an amount of deviation between one or more coordinates of the flight path data and a position of the vehicle based on the guideway data, and adjusting the position of the vehicle relative to the track segment to minimize the amount of deviation in at least one dimension in the 3-D space.

18 Claims, 7 Drawing Sheets

(58) Field of Classification Search
CPC ............ B60L 2240/62; B60L 2240/642; A61P 35/00; C07K 16/2803; C07K 16/283; C07K 16/2851; C07K 16/30; C07K 16/3007; C07K 16/40; C07K 2317/31; C07K 2317/33; C07K 2317/55; C07K 2317/60; C07K 2317/73; C07K 2317/75; C07K 2317/92; C07K 2317/94; Y02T 10/72; Y02T 90/16

See application file for complete search history.

(56) References Cited

U.S. PATENT DOCUMENTS

| | | | | |
|---|---|---|---|---|
| 6,871,597 | B1* | 3/2005 | Hughes | B60L 13/08 |
| | | | | 104/281 |
| 9,090,167 | B2 | 7/2015 | Wamble | |
| 9,261,354 | B1* | 2/2016 | Mercado | G01B 11/16 |
| 2005/0126554 | A1* | 6/2005 | Minica | F41B 5/143 |
| | | | | 124/44.5 |
| 2014/0130703 | A1 | 5/2014 | Wamble, III | |
| 2015/0329097 | A1* | 11/2015 | Duran Ariza | B61B 13/04 |
| | | | | 104/23.1 |
| 2016/0229416 | A1 | 8/2016 | Bambrogan et al. | |
| 2016/0230350 | A1* | 8/2016 | Bambrogan | B61L 23/002 |
| 2016/0244076 | A1* | 8/2016 | Hyde | B61L 23/042 |
| 2016/0355194 | A1* | 12/2016 | Suppes | B64C 39/022 |
| 2017/0183829 | A1* | 6/2017 | Wamble, III | B60L 13/04 |

FOREIGN PATENT DOCUMENTS

JP      H01315204 A      3/1989
WO    WO 2013/003387    1/2013

OTHER PUBLICATIONS

Examination Report dated Jan. 4, 2022, 6 pages, for the corresponding European Patent Application No. 18787950.7.
Extended European Search Report dated Mar. 18, 2021, 11 pages, for the corresponding European Patent Application No. 18787950.7.

* cited by examiner

PATH CORRECTION OF A VEHICLE RELATIVE TO PROJECTED MAGNETIC FLIGHT PATH

CROSS REFERENCE TO RELATED APPLICATIONS

This application is a U.S. National Stage Entry of PCT Application No. PCT/US2018/028187, filed Apr. 18, 2018, which claims benefit of U.S. Provisional Application No. 62/486,860 filed Apr. 18, 2017, the contents of which are entirely incorporated herein.

FIELD

The present disclosure relates to controlling a vehicle during magnetic flight along a guideway. More specifically, the present disclosure relates to minimizing vertical deviation from a projected flight path of the vehicle during magnetic flight along the guideway.

BACKGROUND

Transportation systems are designed to move people and cargo over distances. Transportation systems can include vehicles configured to traverse a roadway, track, guideway, and the like. Vehicles often include suspension systems that modify the motion and/or orientation of passenger or cargo compartments to reduce or attenuate vibrations or other unwanted motions relative to the track. For example, in the context of magnetic transportation systems, magnetic fields between the vehicle and conductive plates of the track can be adjusted to reduce vibrations. In this context, the vehicle may be lifted or levitated by vertical forces such as eddy currents in the conductive plates. By modulating certain aspects of the magnetic fields (e.g., strength, direction, angles, etc.) a control system can adjust these vertical forces such that the vehicle follows a projected path along the track.

BRIEF DESCRIPTION OF THE DRAWINGS

Implementation of the present technology will now be described, by way of example only, with reference to attached figures, wherein.

Figure 1A:
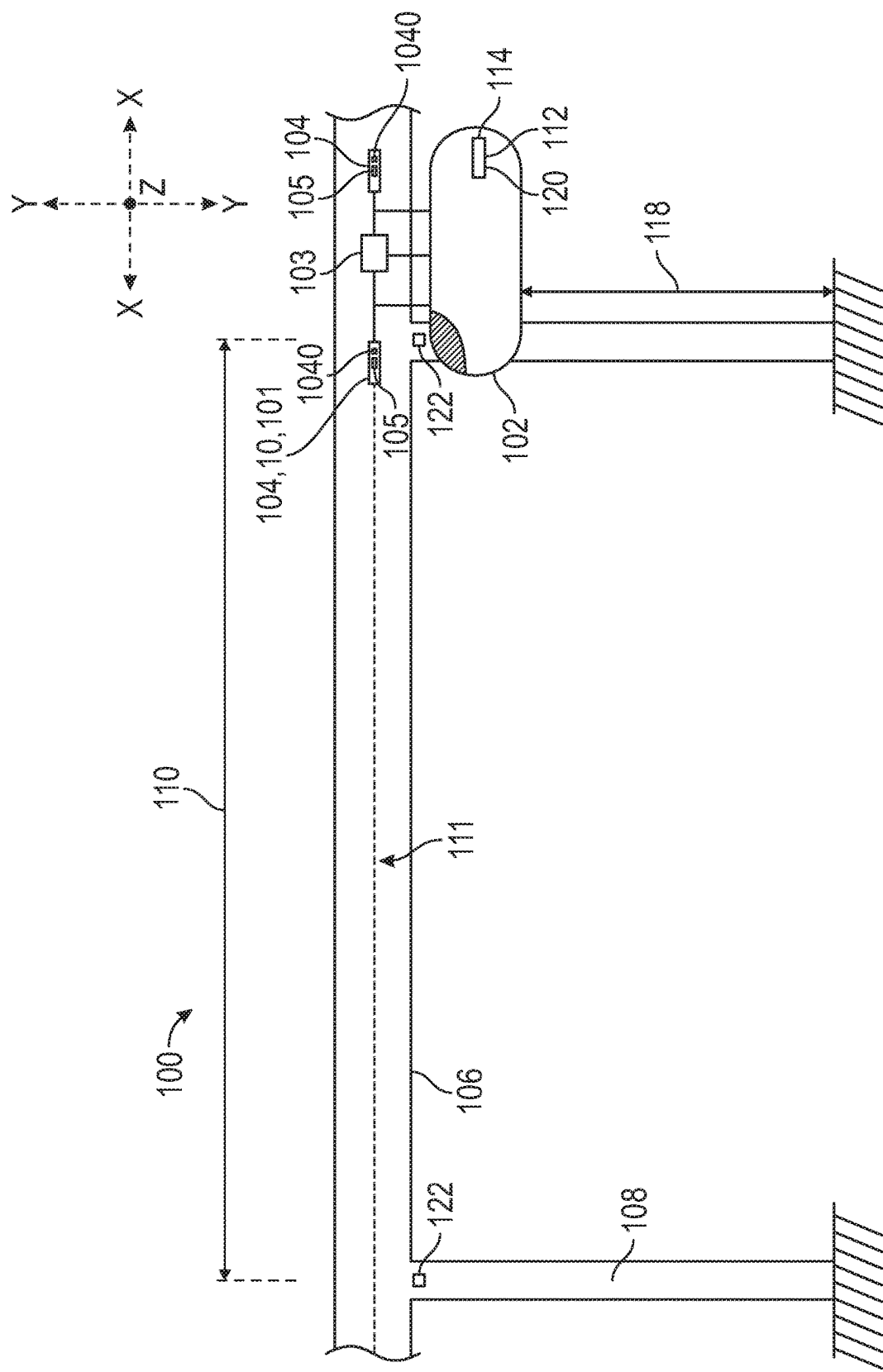
FIG. 1A is a diagrammatic view of an example of a vehicle entering a length of a guideway.

The various examples described above are provided by way of illustration only, may not be shown to scale, and should not be construed to limit the scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the examples described above can be modified within the scope of the appended claims. Claim language reciting "at least one of" a set indicates that one member of the set or multiple members of the set satisfy the claim.

DETAILED DESCRIPTION

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The term "levitation" as used herein refers to the lifting and suspension of an object relative to another object in the absence of a mechanical contact between the objects. "Levitation force" is a force that provides for levitation. The levitation force can act in a vertical direction (the direction opposite the direction of gravity), but the same force can be used to move or position two objects in a lateral direction or in some direction with both vertical and lateral components. To generalize, the terms "levitation" and "levitation force" as used herein refer, respectively, to contactless positioning and a force between two objects in a direction substantially orthogonal to the primary direction of travel. As further used herein, "levitation magnetic flux" and "levitation force" are interchangeable and refer to the same element. A "levitation generator" is a device that is configured to generate magnetic waves that interact with a lifting member to levitate the movable object with respect to the stationary object.

"Drive force" refers to the force required to accelerate, maintain motion or decelerate one object with respect to another. As used herein, "drive force" means a force substantially in line with the primary direction of travel, effected without mechanical contact between the two objects. As further used herein, "drive magnetic flux", "magnetic drive force", and/or "drive force" are interchangeable and refer to the same element. A "drive generator" is a device that is configured to generate magnetic waves that interact with a drive member to drive the movable object with respect to the stationary object.

A "guideway" or "track" refers to components or structure that provides a path for a vehicle (e.g., car, bogie, transport apparatus, etc.) traveling between two locations. As used herein, the term guideway and/or track are interchangeable and refer to the same element. A vehicle refers to a device which is configured for travel along the guideway. The vehicle can be at least partially enclosed, entirely enclosed or have a surface upon which objects or persons can be placed. The vehicle can be coupled with a bogie which is in turn coupled with the guideway. The bogie can be an integral component of the vehicle or a separate component to which the vehicle can be coupled with. A bogie as used herein does not necessarily include wheels, but instead is configured for engagement with the guideway.

A "controller" is generally a computer (carried on the vehicle) that executes a program to analyze data, make decisions, and send out commands. The controller can be an electronic device including, but not limited to, a processor, microprocessor, memory (ROM and/or RAM), and/or storage devices. The controller can be a commercial off-the-shelf (COTS) electronic device, or a specially designed for implementation with the control system.

"Coupled" refers to the linking or connection of two objects. The coupling can be direct or indirect. An indirect coupling includes connecting two objects through one or more intermediary objects. Coupling can also refer to electrical or mechanical connections. Coupling can also include magnetic linking without physical contact. "Substantially" refers to an element essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. The term "closely" is defined as in a way that involves a strong resemblance or connection. The term "closely" can also be defined as nearly, similarly, or within a desired or predetermined limit. A "magnetic source" is any material that naturally produces a magnetic field or can be induced to generate a magnetic field. For example, a magnetic source can include a permanent magnet, an electromagnet, a superconductor, or any other material that produces a magnetic field or can be induced to generate a magnetic field. The term "roll" is defined as a rotation or oscillation about a longitudinal, or X axis; the longitudinal axis spanning between the front and the rear. The term "pitch" is defined as the vertical angle of the long axis of the levitation generator relative to the travel direction. Pitch is the rotation or oscillation of about a transverse, or Z axis, the transverse axis being perpendicular to the longitudinal axis where the transverse axis spans between two sides. The term "altitude" as used herein refers to a distance of the midpoint or pivot point of the levitation generator from the top or bottom of the guideway.

"Flight path" refers to a set of three-dimensional coordinates that define an intended or a projected path for a vehicle over a guideway or track. The term flight path may be used interchangeable with the term projected flight path herein.

The various examples described above are provided by way of illustration only and should not be construed to limit the scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the examples described above can be modified within the scope of the appended claims.

Claim language reciting "at least one of" a set indicates that one member of the set or multiple members of the set satisfy the claim. For example, at least one of A, B, and C, indicates the members can be just A, just B, just C, A and B, A and C, B and C, or A, B, and C.

The present disclosure is directed to a technique for guiding a vehicle over a flight path relative to a guideway or track. These techniques include, for example, a method performed by a vehicle (e.g., and/or sub-components thereof) where a controller of the vehicle receives guideway data generated or stored by one or more guideway sensors (e.g., optical sensors, encoders, radio frequency identification sensors (RFID), radar sensors, etc.) associated with a metallic track. The guideway data can include, for example, information corresponding to a track segment disposed between two or more supports. In addition, the guideway sensors may transmit guideway data from a database that contains information describing track segments, the set of coordinates of the flight path, deflections, etc. The method further includes receiving, at the controller, flight path data (e.g., a set of coordinates in three-dimensional (3-D) space) relating to a flight path or a projected flight path for the vehicle as well as determining an amount of deviation between one or more coordinates of the flight path data and a position of the vehicle based on the guideway data. The method also includes adjusting, by a magnetic suspension system, the position of the vehicle relative to the track segment to minimize the amount of deviation in at least one dimension in the 3-D space.

In some embodiments, adjusting the position of the vehicle relative to the track segment includes adjusting at least one of an altitude, a longitude, or a latitude of the vehicle. For example, the vehicle can include a magnetic suspension system having one or more levitation generators. The levitation generators may be adjusted to provide more/less levitation force and/or an angle of the levitation generator (relative to the track segment) may be changed to modify the position and/or orientation (e.g., pitch, roll, and/or yaw) of the vehicle relative to the track segment to minimize the amount of deviation. Notably, the levitation generators may be individually or independently adjusted or they may be adjusted in cooperation or concert.

Moreover, the vehicle can include one or more drive generators operable to provide a drive force that provides a velocity to the vehicle. Here, the drive generator(s) can be adjusted to change the velocity of the vehicle relative to the track segment to minimize the amount of deviation in one or more dimensions of the 3-D space. For example, a vehicle traveling at a higher or faster velocity may produce less deflection in the track segment. Accordingly, increasing the velocity of the vehicle may minimize the amount of deviation. Alternatively, in some embodiments, a lower or slower velocity may produce less deflection in the track segment such that decreasing the velocity of the vehicle can minimize the amount of deviation. Furthermore, the drive generator(s) may cooperate and act in conjunction with the levitation generators to change the vehicle's position relative to the track segment. With respect to the velocity of the vehicle, the method includes steps to determine the velocity based on optical sensors, encoders, and/or radar sensors.

The method also describes determining the deflection of the track segment. For example, the guideway data can include a length corresponding to the track segment. The controller receives the guideway data, as discussed above, and determines the amount of deflection in the 3-D space based on the length of the track segment and a velocity of the vehicle relative to the length of the track segment. For example, certain relationships may exist and define the deflection of the track segment based on a known length of a track segment, the weight of the vehicle and/or the speed or velocity of the vehicle traversing the length track segment. In this fashion, the controller can determine the estimated or anticipated deflection over the track segment and thus, the amount of deviation between coordinates of the flight path data and a position of the vehicle.

In other embodiments, present disclosure includes a method controlling altitude of a vehicle moving along a guideway for magnetic flight. The method receives, at a controller, data generated by one or more sensors. The method also receives, at the controller, data relating to a flight path of the vehicle. The controller determines a speed of the vehicle relative to the guideway for magnetic flight and calculates a deviation of the vehicle from the flight path. The controller adjusts the altitude of the vehicle relative to the guideway for magnetic flight by changing certain aspects of a magnetic flight suspension system causing the vehicle to more closely track the flight path.

The sensors include at least one sensor associated with a corresponding control device. The at least one sensor can be an ultrasonic sensor, and the control device can be a levitation generator. To determine the speed of the vehicle relative to the guideway for magnetic flight, the controller receives a sensed horizontal velocity from one of an optical sensor, an encoder, an RFID, or a forward looking radar. The altitude of the vehicle of the guideway for magnetic flight is determined by the controller receiving data from an altitude sensor which can be at least one of a laser sensor, an optical sensor, a camera sensor, a mechanical sensor, or a magnetic sensor. The received data relating to a flight path of the vehicle is from a database that contains information describing guideway segments. The data is the corresponding guideway segments of an intended flight path based on a starting and ending destination of the vehicle. The deviation of the vehicle from the projected flight path is calculated by taking a difference of the flight path and a current position of the vehicle relative to the guideway, where the deviation can be in three dimensions, thereby determining roll, altitude, and pitch.

Certain aspects of the magnetic flight suspension system can be changed by varying an angle of one or more of a plurality of levitation generators. The angle of each of the levitation generators can be varied independent from another and can be adjusted by a drive motor. Also, a drive generator can be varied to produce a different velocity of the vehicle in changing the magnetic flight suspension system.

The present disclosure is also directed to a system configured to control a vehicle moving along a guideway for magnetic flight. The system can include a plurality of levitation generators which has at least one sensor associated therewith, a plurality of sensors operable to detect position relative to the guideway, and a controller including at least one processor unit which is operably coupled to the plurality of sensors. The controller can be configured to receive data generated by the plurality of sensors and data relating to a flight path of the vehicle. The controller can also determine an altitude of the vehicle relative to the guideway and a speed, using one or more of the plurality of sensors, of the vehicle relative to the guideway for magnetic flight. The controller can then calculate a deviation of the vehicle from the flight path and transmit data to adjust the altitude of the vehicle relative to the guideway for magnetic flight by changing certain aspects of a magnetic flight suspension system causing the vehicle to more closely track the flight path.

The present disclosure is also directed to a method controlling altitude of a vehicle moving along a guideway for magnetic flight. The method includes receiving, at a controller, data generated by one or more sensors and data relating to a flight path of the vehicle. The controller determines an altitude of the vehicle relative to the guideway for magnetic flight and a speed of the vehicle relative to the guideway for magnetic flight. The controller then calculates the deviation of the vehicle from the flight path and levitation modulation required to reduce the deviation from the magnetic flight path. Levitation modulation signals are sent to one or more levitation generators. The controller adjusts the altitude of the vehicle relative to the guideway for magnetic flight by levitation modulation equivalent to the deviation from the flight path thereby maintaining a path closer to the flight path While examples are illustrated in relation to guideway constructed in a substantially horizontal plane, the present disclosure and techniques disclosed herein are equally applicable to vertically oriented guideways, inclined guideways, and/or combinations thereof. In some vertically oriented guideways, the system can more closely resemble an elevator. In other systems, the guideway can include component that are horizontal, vertical, angled, or any combination thereof.

FIG. 1A illustrates an example of a levitation transportation system 100 with a vehicle 102 within or entering a guideway 106. The guideway 106 is formed by a plurality of track segments or track pieces disposed between supports 108. Supports 108 provide structural integrity and support for each guideway 106 piece or track segment. Notably, the guideway 106 pieces can have various lengths 110 and are often made of metallic elements (e.g., ferrous, non-ferrous, etc.). While the illustrated example shows a segment of the guideway 106 having supports 108 on opposing ends, to the segmented track can include supports 108 that have varying arrangements, such as having a center support with secondary supports extending therefrom.

The guideway 106 pieces can form a network of track allowing a vehicle 102 to move within the levitation transportation system 100. While the segmented guideway 106 piece that is illustrated spans the portion between two supports 108, the piece can be a portion of the span and be joined to another guideway 106 pieces on either side, such that a plurality of pieces span the portion between the two supports 108.

Figure 1B:
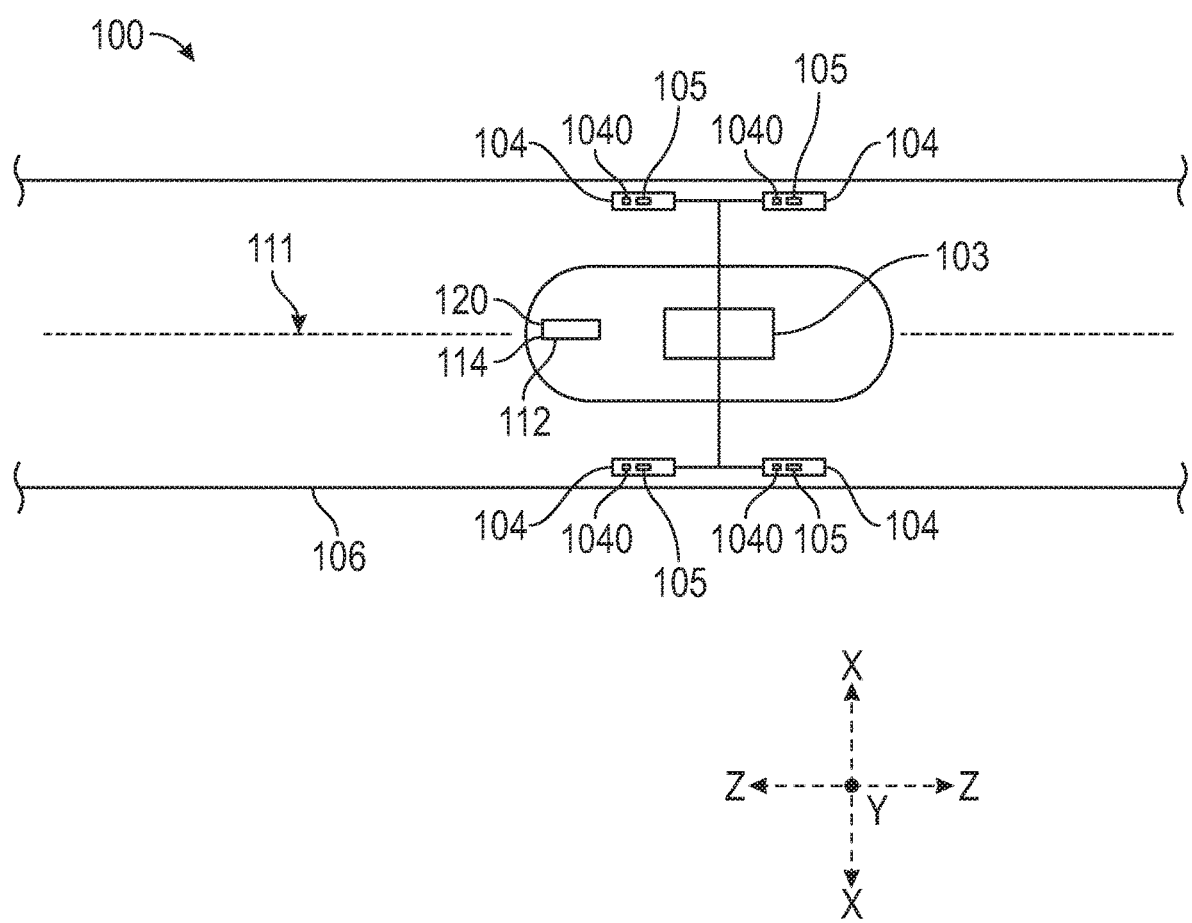
FIG. 1B is a top, diagrammatic view of an example of a vehicle in a length of a guideway.

The vehicle 102 has a magnetic flight suspension system 101 operates to adjust a position of vehicle 102 relative to guideway 106 to more closely follow a flight path 111. For example, the magnetic flight suspension system 101 can include a control device 10 as well as a plurality of levitation generators 104. The plurality of levitation generators 104 can be at least partially received within the guideway 106 and allows the vehicle 102 to travel within the levitation transportation system 100. The levitation generators 104 can magnetically engage and interact with the guideway 106 to guide the vehicle 102 along the transportation system 100. In operation, the levitation generators 104 and the guideway 106 are typically physically separated by a distance as the vehicle 102 travels within the levitation transportation system 100. In particular, the levitation generators 104 generate a magnetic force or levitation force to elevate the vehicle 102 above or at a spaced distance (but within the segmented track) from the guideway 106. One or more levitation generators 104 can be implemented. Here, FIG. 1A shows two levitation generators 104, but in other illustrated examples, as in FIG. 1B, four levitation generators 104 are used, with two more levitation generators 104 positioned cross-sectionally parallel with to the two shown levitation generators 104 in FIG. 1. The four levitation generators 104 can each pitch, or rotate about a Z axis, to adjust the altitude, roll, and/or pitch of the vehicle 102.

The levitation generators 104 can be operable to adjust pitch by varying an angle of one or more of the levitation generator 104. As such, the levitation generators 104 can adjust the altitude, roll, and/or pitch of the vehicle 102 by varying the combination of the levitation generators 104, which will be described in further detail below. As the levitation generators 104 can be independently operated or adjusted from one another, the vehicle 102 can be adjusted in three dimensions relative to the guideway 106. The levitation generators 104 can be adjusted by a drive motor 1040. In one embodiment, each levitation generator 104 is coupled to an individual drive motor 1040, while in other embodiments, multiple levitation generators 104 may be coupled to more than one levitation generator 104 such that a single drive motor 1040 adjusts two corresponding levitation generators 104 (e.g., using varying gear ratios, etc.). For example, the levitation generator 104 can operate in accordance with the levitation generators described in U.S. Pat. No. 9,090,167, issued on Jul. 28, 2015, the entire contents of which are incorporated herein by reference.

The magnetic flight suspension system 101 can also include changing and varying a drive generator 103. One or more drive generators can be included in the levitation transportation system 100. The drive generator 103 is configured to provide a drive force. Varying the drive force produced by the drive generator 103 produces thrust and accelerates the vehicle 102 to a particular velocity. Notably, the drive generator 103 may produce an angular drive force that can include lift force components as well as thrust force components. In this fashion, drive generator 103 may cooperate with the levitation generators 104 to elevate or lift the vehicle 102 (or portions thereof) above the guideway 106. In some embodiments, higher or faster velocities correspond with greater lift forces. Varying the drive force between each of the four levitation generators 104 and the drive generator 103 can adjust the altitude 118 of the vehicle 102 relative to the ground and/or relative to segments of the guideway 106. For example, the drive generator can operate in accordance with the drive generator described in U.S. Pat. No. 9,090,167 mentioned above.

Figure 2:
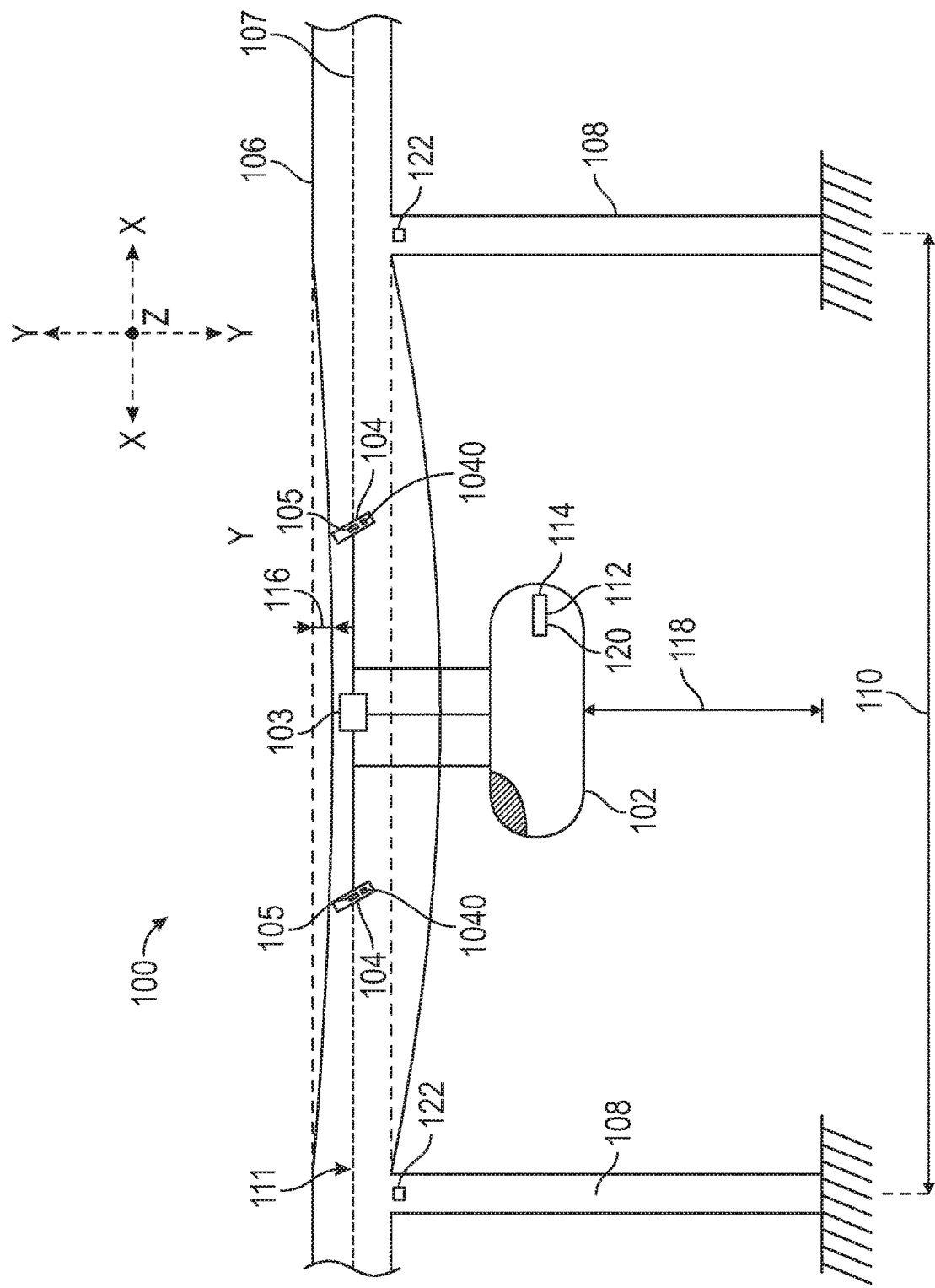
FIG. 2 is a diagrammatic view of an example of a levitation generator maintaining a predetermined altitude of a vehicle along a deflected guideway.

The vehicle 102 can include a controller 114 capable of changing, adjusting, or otherwise instructing magnetic flight suspension system 101, including levitation generator 104, drive generator 103 (and combinations thereof) to alter the position of the vehicle 102 to more closely follow the flight path 111. For example, in some embodiments, the controller 114 may instruct the magnetic flight suspension system to maintain a predetermined altitude 118 relative to the ground as the vehicle 102 traverses the guideway 106. For example, the guideway 106, as shown in FIG. 2, can have a deflection 116 over the length 110 of the guideway 106 in the flight path 111 (or projected flight path) of the vehicle 102. The deflection 116 can occur due to a variety of different factors. For example, the deflection 116 can occur because of a change of path in the guideway 106. In other examples, the deflection 116 can occur due to the weight of the guideway 106 itself. Additionally, the deflection 116 can occur because of the weight of one or more vehicles 102 traveling along the guideway 106. The deflection 116 in the flight path 111 can be a vertical deflection, as in FIG. 2, a pitch deflection, as in FIG. 4, a rotational deflection, as in FIG. 5, or a combination thereof. For a vertical deflection, the altitude of the vehicle is adjusted; for a pitch deflection, the pitch of the vehicle is adjusted; and for a rotational deflection, the roll of the vehicle is adjusted. The controller 114, by changing certain aspects of the magnetic flight suspension system 101, can adjust the roll, altitude, and/or pitch of the vehicle 102 to offset for the deflection 116 of the guideway 106 in the flight path 111 and more closely track the flight path 111. The controller 114 can be configured to receive and determine information about the vehicle 102 and guideway 106. The controller 114 can be a processor, microprocessor, computer, server, or any other electronic device capable of determining the deflection of the length 110 of guideway 106 in response to information received from one or more sensors.

The vehicle 102 can also be adjusted by the controller 114 changing certain aspects of the magnetic flight suspension system 101 to adjust to variations of the vehicle 102 to more closely track the flight path 111. For example, as will be further discussed below, passengers, in the vehicle 102, can move around which may cause unwanted rotation, such as rotation about the X axis. The controller 114 can adjust individual levitation generators 104 to correct the position of the vehicle 102.

The controller 114 receives relevant information or data related to the levitation transportation system 100 such as the flight path 111, the altitude 118, the spacing of supports 108, and the length 110 of the segmented track. In at least one example, the received data relating to the flight path 111 of the vehicle 102 is from a database that contains information describing segments of the guideway 106. The data relating to the flight path 111 of the vehicle 102 is based on the corresponding guideway segments 106 of an intended flight path based on a starting and ending destination of the vehicle 102.

In determining the altitude 118 of the vehicle 102, the controller 114 can receive data from an altitude sensor 112. The altitude sensor 112 can be located in the vehicle 102, or in other examples, the altitude sensor 112 can be located in the guideway 106 and/or the supports 108. The altitude sensor 112 can be at least one of a laser sensor, an optical sensor, a camera sensor, a mechanical sensor, a magnetic sensor, or any suitable sensor to determine altitude of the vehicle 102. The controller 114 can also determine information such as the weight and speed of the vehicle 102. In determining the speed of the vehicle 102 relative to the guideway 106 for magnetic flight, the controller 114 receives a sensed horizontal velocity. The horizontal velocity is in relation to the guideway 106. The speed of the vehicle 102 can be based on data received from one of an optical sensor, an encoder, an RFID, a forward looking radar, or any other suitable sensor or method to determine speed of the vehicle 102. The weight of the vehicle 102 can include the weight of the vehicle 102, weight of passengers, payload, cargo, or any combination thereof. In at least one example, the controller 114 determines the weight of the vehicle 102 instantaneously. In at least one example, the controller 114 determines, instantaneously, the weight of the vehicle 102, along with contents of the vehicle 102, which can include one or more of the passengers, payload, and/or cargo. In other examples, the controller 114 receives the weight of the vehicle 102 at launch of the vehicle 102 within the levitation transportation system 100.

The controller 114 can receive data from one or more sensors 120 coupled with the levitation transportation system 100. The one or more sensors 120 can be disposed on the vehicle 102, the guideway 106, and/or the supports 108. The one or more sensors 120 can be optical, radio, and/or near field communicator configured to determine altitude, speed, weight, location, or any combination thereof. The one or more sensors 120 provide the controller 114 with data necessary to determine deflection 116 of the guideway 106. In at least one example, the one or more sensors 120 include at least one sensor 105 associated with a corresponding control device 10, such as a levitation generator 104. For example, the one or more sensors include at least four ultrasonic sensors 105, each of which is associated with a corresponding levitation generator 104. As illustrated, the sensor 105 is coupled with the levitation generator 104; in other examples, the sensor 105 can be coupled elsewhere, for example the vehicle 102. The one or more sensors 105 can be ultrasonic sensors configured to interact with the guideway 106.

In additional examples, the one or more sensors 120 can include laser sensors configured to encode and/or transmit data between adjacent vehicles 102. The encoded/transmitted data can be the length 110 of segmented track, deflection of the segmented track, speed of adjacent vehicles, weight of adjacent vehicles, and/or any other data necessary to the controller 114.

As can be seen in FIG. 1, the one or more sensors 120 can be communicatively coupled with a transmitter 122 which can be disposed on the support 108 to receive data relative to the length 110 of guideway 106. The data assists the controller 114 in determining the anticipated deflection 116 of the upcoming length 110 of guideway 106 as the vehicle 102 travels along the guideway 106. Also, the data assists the controller 114 in determining any deviation of the vehicle 102 from the flight path 111.

At least one of the one or more sensors 120 can communicate with the transmitter 122 disposed on the support 108 to receive data relating the length 110 of the guideway segment 106. The transmitter 122 can be a barcode 124, such as a Quick Response (QR) code, a radio frequency identification (RFID) tag, or similar device configured to provide data to the one or more sensors 120.

The transmitter 122 can be disposed on the support 108, the guideway 106, or any portion of the levitation transportation system 100 with communication range of the one or more sensors 120. In the illustrated example, the transmitter 122 is on the support 108. The transmitter 122 can be located at different portions of the levitation transportation system 100. For example, the transmitter 122 can be located on the guideway 106 at a joint or in the middle. The data associated with the transmitter 122 can be static or dynamic. In situations where the data associated with the transmitter 122 is dynamic, the data received by the vehicle 102 can include the weight of the preceding vehicle(s) 102, the temperature of the rail, the ambient air temperature, the weight of the following vehicle(s) 102, or any other necessary information.

The transmitter 122 can store data relating to the flight path 111, for example the length 110 or path of the guideway 106 between two or more supports 108. In FIG. 1, the transmitter 122 communicates the length 110 of guideway 106 between two supports 108. In other examples, the transmitter 122 can communicate data relating to two or more lengths 110 of guideway 106, thus reducing the total number of transmitters 122 necessary within the levitation transportation system 100.

The controller 114, after receiving data generated by the one or more sensors 120, data relating to the flight path 111 of the vehicle 102, and after determining the altitude 118 and the speed of the vehicle 102 relative to the guideway for magnetic flight, calculates the a deviation of the vehicle 102 from the flight path 111. The deviation of the vehicle 102 from the flight path 111 can occur because of deflection of the guideway 106 or other factors such as wind, passenger movement, or other factors. The deviation of the vehicle 102 from the flight path 111 can also occur because of factors such as the speed based on the rotation of the drive generator 103, angles of the levitation generators 104, weight of the vehicle 102, or any other possible factors.

The controller 114 then calculates a levitation modulation required to reduce the deviation from the flight path 111 and sends levitation modulation signals to one or more levitation generators 104 such that the levitation generators 104 adjust its pitch. The controller 114 adjusts the altitude of the vehicle 102 relative to the guideway for magnetic flight by levitation modulation equivalent to the deviation from the flight path 111, thereby maintaining a path closer to the flight path 111. Modulation of the angle or pitch of the levitation generators 104 change the lift vector at each levitation generator 104, thus affecting the vertical motion of the vehicle 102. The combination of changing angles or pitches of individual levitation generators 104 permits the controller 114 to adjust the vehicle 102 in terms of altitude, roll, and/or pitch.

FIG. 2 illustrates a vehicle 102 within a deflected length 110 of guideway 106 of a levitation transportation system 100. The length 110 of guideway 106 can be deflected from the weight of the vehicle 102 or is deflected because of the flight path 111. As illustrated in FIG. 2, the deflection is temporary and the guideway 106 returns to the original altitude. In other examples, the slope of the guideway 106 in the flight path 111 can have different gradients or be extended over a longer distance. In yet other examples, the height of the guideway 106 may not return to its previous height, for example if the vehicle 102 is to be returned to the ground. The deflection 116 is mathematically predictable and can be calculated using the known weight and speed of the vehicle 102, and length 110 of the guideway 106. The controller 114 calculates the deviation of the vehicle 102 from the flight path 111 and is able to determine the deviation in terms of the altitude, roll and/or pitch. The controller 114 calculates the deviation of the vehicle 102 by taking a difference of the flight path 111 and a current position of the vehicle 102 relative to the guideway 106. The controller 114 can calculate the deflection 116 of the guideway 106 in view of the vehicle 102 weight, speed, and the length 110 of the guideway 106. The controller 114 then adjusts the levitation of the vehicle 102 to accommodate for the deflection 116 and maintain the predetermined altitude 118.

Figure 3:
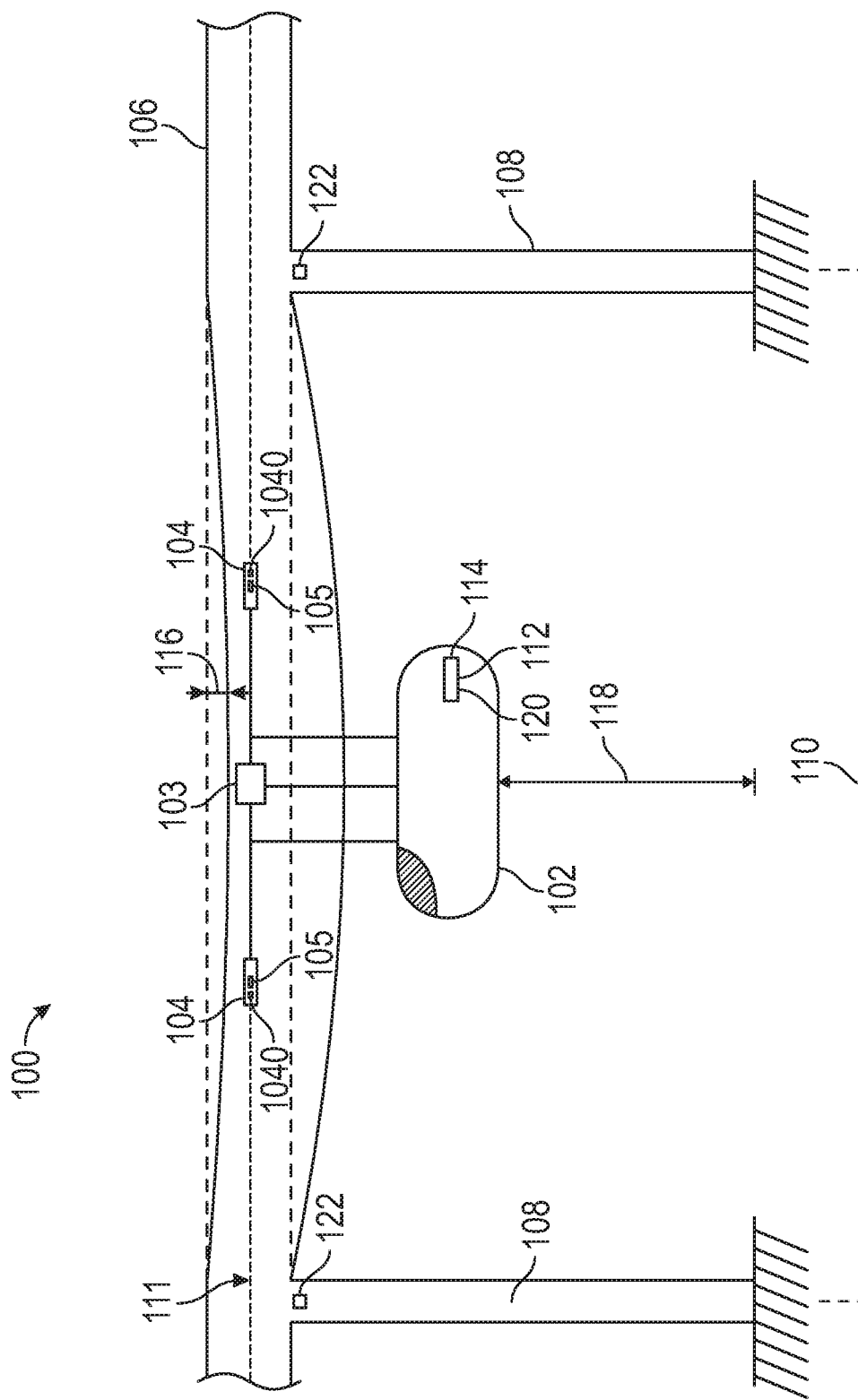
FIG. 3 is a diagrammatic view of an example of a vehicle having an increased speed to maintain a predetermined altitude.

The controller 114 can adjust the levitation or altitude of the vehicle 102 to maintain the predetermined altitude 118 in a number of ways including, but not limited to, increasing the speed of the vehicle 102 or adjusting the pitch of the levitation generators 104, thereby generating more levitation, as illustrated in FIG. 3. FIG. 2 illustrates a vehicle 102 having the levitation generators 104 pitched to increase levitation relative to the levitation generator of FIG. 1, thereby maintaining the predetermined altitude 118. To compensate for altitude, the levitation generators 104 collective pitch upward or downward as desired such that the vehicle 102 maintains balance. For example, to lower the altitude, the levitation generators 104 can collectively pitch downward. Conversely to raise the altitude, the levitation generators 104 can collectively pitch upward.

The guideway 106 can have one or more markings 107 disposed on an inner surface thereof. The one or more markings 107 can correspond to the intended or projected flight path on guideway 106. The one or more markings 107 can be physical markings such as colored paint, reflective tape, reflective paint, or may include overlaid/projected markings such as laser light, and so on. The markings 107 provide a contrast with the inner surface of the guideway 106 and may be optically recognized or sensed by components controller 114. In some instances, the one or more markings 107 can be disposed on the inner surface to project a level flight path under different guideway 106 situations, i.e. one vehicle, two vehicles, three vehicles.

The sensors 105 on the levitation generators 104 can be capable of determining their position relative to the flight path 111 and/or one or more markings 107, thereby maintaining a level flight path. The sensors 105 can detect deviations between the marking 107 and instruct the controller 114 to adjust the pitch of the levitation generator 104 to maintain the level flight path. The controller 114 can have pre-calculated deflection stored therein for each guideway 106 under various circumstances. The controller 114 can adjust the levitation generator 104 and altitude sensors from one marking 107 to another marking 107 if conditions of the transportation system 100 change, for example a vehicle entering/exiting the guideway 106.

FIG. 3 illustrates a vehicle 102 having an increased speed relative to the segmented track while having a levitation generator 104 with a substantially similar pitch to the levitation generator 104 of FIG. 1. The drive generator 103 can increase the speed relative to the guideway 106 which increases the levitating force generated by the levitation generator 104, thus allowing the vehicle 102 to maintain the predetermined altitude 118.

The controller 114 adjusts the levitation of the vehicle 102 to maintain a substantially linear direction of travel, the predetermined altitude 118. Similarly, the altitude of the vehicle 102 may change due to other factors such as passenger weight or movement, or wind. The controller 114 can also adjust the altitude of the vehicle 102 to cause the vehicle 102 to more closely track the flight path 111.

Figure 4:
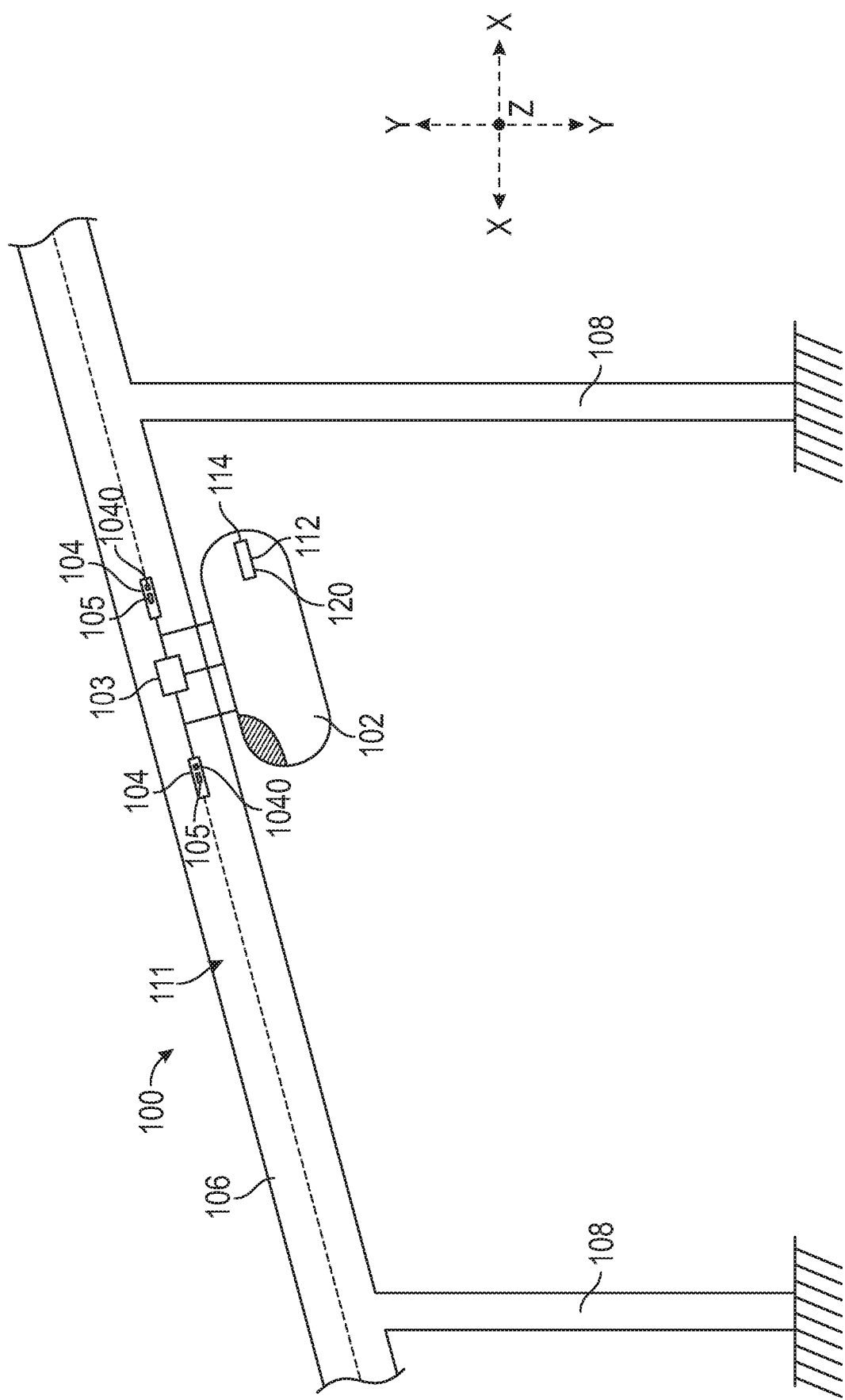
FIG. 4 is a diagrammatic view of an example of a vehicle having a pitch deviation.

In situations where the segmented track is arranged in a substantially non-horizontal configuration, such as a declining slope or an increasing slope, the controller 114 can adjust the pitch of the vehicle 102 to account for the deflection of and more closely track the substantially non-horizontal segmented guideway 102, as illustrated in FIG. 4. While FIG. 4 is illustrated with a continuous downward slope, the pitch of the vehicle 102 may be adjusted to compensate for an upward slope, varying slopes, and/or any vertical deflection such that the pitch of the vehicle 102 is adjusted to more closely track the guideway 106 and flight path 111. Also, the pitch of the vehicle 102 may be adjusted to compensate shifting or unbalance of weight within the vehicle 102 between the front and rear of the vehicle 102. In FIG. 4, the guideway 106 has a downward slope such that the pitch of the vehicle 102 is adjusted to more closely track the flight path 111 within the guideway 106. The pitch of the vehicle 102 can be adjusted by changing the pitch or angle between the front and rear levitation generators 104. As such, to compensate for a higher end such that that end of the vehicle 102 is to be lowered, the levitation generators 104 on the higher end pitch downward and/or the levitation generators 104 on the lower end can pitch upward. Conversely, to compensate for a lower end such that that end of the vehicle 102 is to be raised, the levitation generators 104 on the lower end pitch upward and/or the levitation generators 104 on the higher end can pitch downward.

Figure 5:
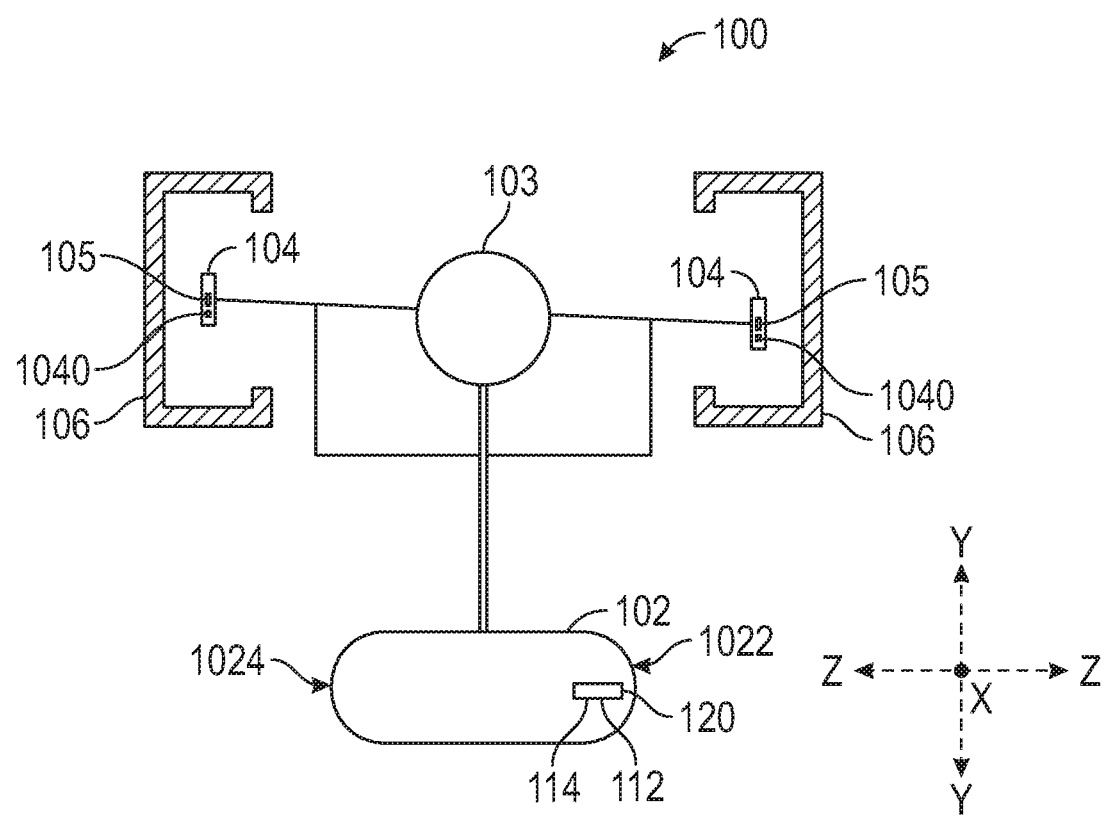
FIG. 5 is a diagrammatic view of an example of a vehicle having a roll deviation.

FIG. 5 is a front view of the transportation system 100, illustrating changing of certain aspects of a magnetic flight suspension system 101 causing the vehicle 102 to rotate, or roll, to more closely track the flight path 111. The deviation of the vehicle 102 from the projected flight path is illustrated as a roll. The controller 114 calculates the deviation of the vehicle 102 from the flight path 111 and is able to determine the deviation as roll. The controller 114 calculates the deviation of the vehicle 102 by taking a difference of the flight path 111 and a current position of the vehicle 102 relative to the guideway 106. The vehicle 102 may rotate or roll because of many factors, including movement of passengers, wind, change in direction, or any other possible factors. Individual or paired levitation generators 104 can be adjusted to cause the vehicle 102 to more closely track the flight path 111 and/or to correct any unwanted roll. By adjusting the pitch of levitation generators 104 on one side, the vehicle 102 may roll about the X axis to more closely track the desired flight path 111 or correct any unwanted alignment. To compensate for roll, the levitation generators 104 on the low side can pitch upward and/or the levitation generators 104 on the high side can pitch downward. As illustrated in FIG. 4, the vehicle 102 has rolled such that the right side 1022 (from the illustrated perspective) has dropped to a lower altitude than the left side 1024. To rotate the vehicle 102 in a counter-clockwise direction (from the illustrated perspective), the levitation generators 104 on the right side can pitch upward and/or the levitation generators 104 on the left side can pitch downward. If the vehicle 102 has rolled such that the left side 1024 has dropped to a lower altitude than the right side 1022, and/or to rotate the vehicle 102 in a clockwise direction (from the illustrated perspective, the levitation generators 104 on the left side can pitch upward and/or the levitation generators 104 on the right side can pitch downward.

While the change of the altitude, pitch, and roll are separately discussed above, any combination can be implemented. Pitches of the four individual levitation generators 104 can provide adjustment to deviations in three dimensions.

The number of vehicles in a length 110 of guideway 106 can vary depending on the length 110 of the segmented track, the vehicle 102 speed, the spacing between vehicles, the number of vehicles in the levitation transportation system 100, and/or the frequency/popularity of the path. Certain routes, destinations, or segmented guideways 106 can have a different use rate changing the potential number of vehicles 102 within a length 110 of guideway 106.

Figure 6:
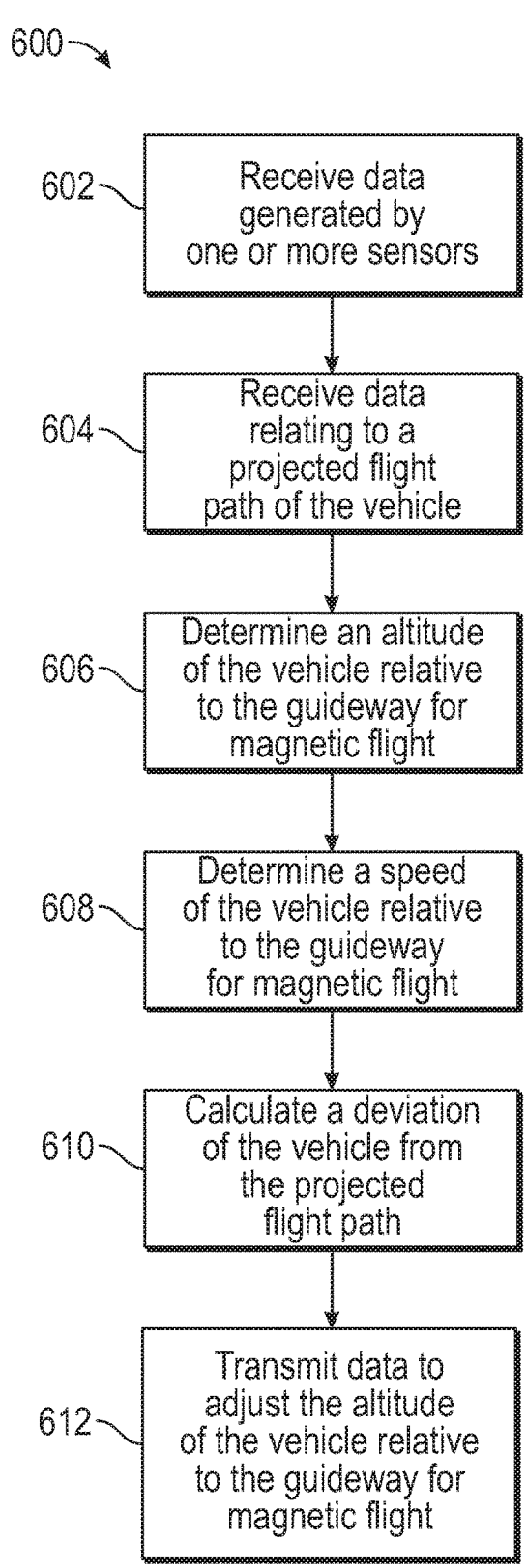
FIG. 6 is a flow chart of an example of a method for controlling altitude.

Referring to FIG. 6, a flowchart is presented in accordance with an example. The example method 600 is provided by way of example, as there are a variety of ways to carry out the method 600. The method 600 described below can be carried out using the configurations illustrated in FIGS. 1-5, for example. Each block shown in FIG. 6 represents one or more processes, methods or subroutines, carried out in the example method 600. Furthermore, the illustrated order of blocks is illustrative only and the order of the blocks can change according to the present disclosure. Additional blocks may be added or fewer blocks may be utilized, without departing from this disclosure. The example method 600 can begin at block 602.

At block 602, the method 600 receives, at the controller, data generated by one or more sensors. The one or more sensors includes at least one sensor associated with a corresponding control device. The control device can be a levitation generator, and the at least one sensor can be an ultrasonic sensor. In at least one example, the one or more sensors includes at least four ultrasonic sensors, each of which is associated with a corresponding levitation generator.

At block 604, the method 600 receives, at the controller, data relating to a projected flight path of the vehicle. The projected flight path of the vehicle can be from a database that contains information describing guideway segments. The data can be corresponding guideway segments of an intended flight path based on a starting and ending destination of the vehicle.

At block 606, the method 600 determines, at the controller, an altitude of the vehicle relative to the guideway for magnetic flight. The controller can receive data from an altitude sensor. The altitude sensor can include at least one of a laser sensor, an optical sensor, a camera sensor, a mechanical sensor, a magnetic sensor, or any other suitable sensor.

At block 608, the method 600 determines, at the controller, a speed of the vehicle relative to the guideway for magnetic flight. The controller may receive a sensed horizontal velocity. The speed of the vehicle can be based on data received from one of an optical sensor, an encoder, an RFID, a forward looking radar, or any other suitable sensor or method.

At block 610, the method 600 calculates, at the controller, a deviation of the vehicle from the projected flight path. To calculate the deviation, the controller can take a difference of the projected flight path and a current position of the vehicle relative to the guideway. The controller is able to calculate the deviation in three dimensions, thereby determining roll, altitude, and pitch.

At block 612, the method 600 transmits, from the controller, data to adjust the altitude of the vehicle relative to the guideway for magnetic flight by changing certain aspects of a magnetic flight suspension system causing the vehicle to more closely track the projected flight path. The vehicle can be adjusted by varying an angle of one or more of a plurality of levitation generators. The angle of each of the plurality of levitation generators can be varied independent from one another, and the angle of each of the plurality of levitation generators can be adjusted by a drive motor. Also a drive generator can be varied to produce a different velocity of the vehicle.

Figure 7:
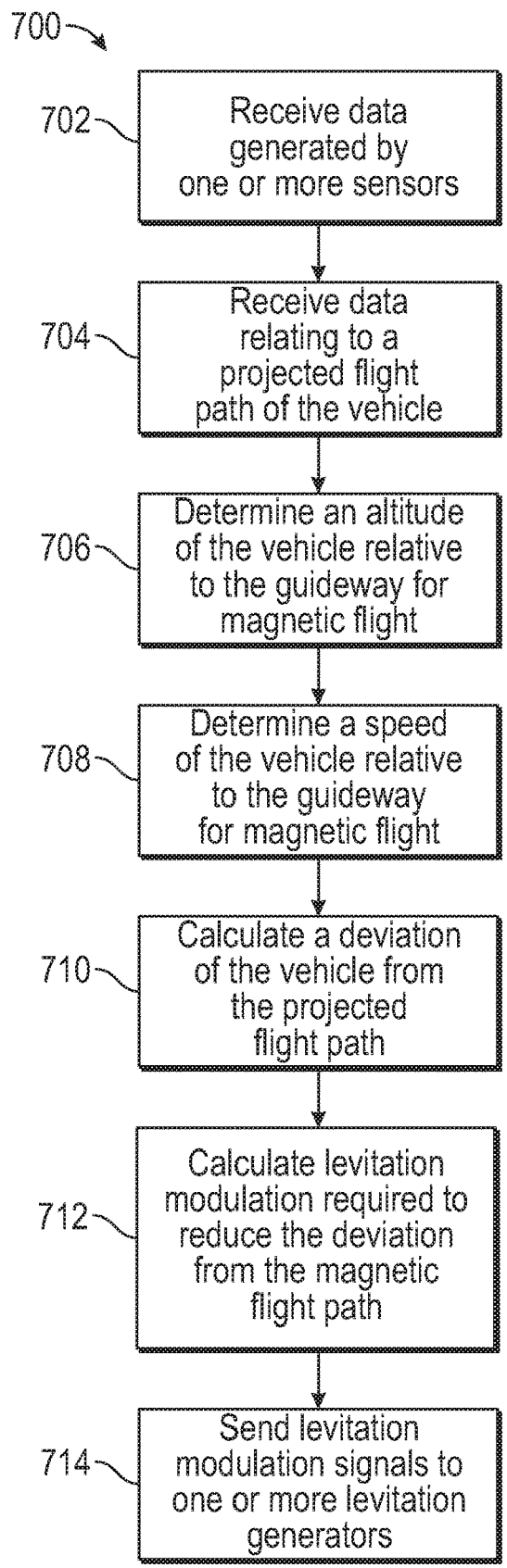
FIG. 7 is a flow chart of another example of a method for controlling altitude.

Referring to FIG. 7, a flowchart is presented in accordance with an example. The example method 700 is provided by way of example, as there are a variety of ways to carry out the method 700. The method 800 described below can be carried out using the configurations illustrated in FIGS. 1-5, for example. Each block shown in FIG. 7 represents one or more processes, methods or subroutines, carried out in the example method 700. Furthermore, the illustrated order of blocks is illustrative only and the order of the blocks can change according to the present disclosure. Additional blocks may be added or fewer blocks may be utilized, without departing from this disclosure. The example method 700 can begin at block 702.

At block 702, the method 700 receives, at the controller, data generated by one or more sensors. The one or more sensors includes at least one sensor associated with a corresponding control device. The control device can be a levitation generator, and the at least one sensor can be an ultrasonic sensor. In at least one example, the one or more sensors includes at least four ultrasonic sensors, each of which is associated with a corresponding levitation generator.

At block 704, the method 700 receives, at the controller, data relating to a projected flight path of the vehicle. The projected flight path of the vehicle can be from a database that contains information describing guideway segments. The data can be corresponding guideway segments of an intended flight path based on a starting and ending destination of the vehicle.

At block 706, the method 700 determines, at the controller, an altitude of the vehicle relative to the guideway for magnetic flight. The controller can receive data from an altitude sensor. The altitude sensor can include at least one of a laser sensor, an optical sensor, a camera sensor, a mechanical sensor, a magnetic sensor, or any other suitable sensor.

At block 708, the method 700 determines, at the controller, a speed of the vehicle relative to the guideway for magnetic flight. The controller may receive a sensed horizontal velocity. The speed of the vehicle can be based on data received from one of an optical sensor, an encoder, an RFID, a forward looking radar, or any other suitable sensor or method.

At block 710, the method 700 calculates, at the controller, a deviation of the vehicle from the projected flight path. To calculate the deviation, the controller can take a difference of the projected flight path and a current position of the vehicle relative to the guideway. The controller is able to calculate the deviation in three dimensions, thereby determining roll, altitude, and pitch.

At block 712, the method 700 calculates, at the controller, levitation modulation required to reduce the deviation from the magnetic flight path. The levitation modulation can be in terms of roll, altitude, and/or pitch.

At block 714, the method 700 sends, from the controller, levitation modulation signals to one or more levitation generators. The controller adjusts the altitude of the vehicle relative to the guideway for magnetic flight by levitation modulation equivalent to the deviation from the projected flight path thereby maintaining a path closer to the projected flight path. The vehicle can be adjusted by varying an angle of one or more of a plurality of levitation generators. The angle of each of the plurality of levitation generators can be varied independent from one another, and the angle of each of the plurality of levitation generators can be adjusted by a drive motor. Also a drive generator can be varied to produce a different velocity of the vehicle.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for guiding a vehicle over a flight path, the method comprising:
   receiving, by a controller of the vehicle, guideway data generated by one or more guideway sensors associated with a metallic track, the guideway data including information corresponding to a track segment disposed between two or more supports, wherein the guideway data further includes a length of the track segment;
   receiving, by the controller, flight path data for the vehicle, the flight path data representing a set of coordinates in three-dimensional (3-D) space;
   determining, at the controller, a deflection of the track segment in the 3-D space based at least on the length of the track segment and a velocity of the vehicle relative to the length of the track segment;
   determining, by the controller, an amount of deviation between one or more coordinates of the flight path data and a position of the vehicle based on the guideway data and deflection of the track segment; and
   adjusting, by a magnetic suspension system, the position of the vehicle relative to the track segment to minimize the amount of deviation in at least one dimension in the 3-D space.

2. The method of claim 1, wherein adjusting the position of the vehicle relative to the track segment further comprises adjusting at least one of a an altitude, a longitude, or a latitude of the vehicle.

3. The method of claim 1, wherein the one or more guideway sensors comprises at one of an optical sensor, an encoder, a radio frequency identification (RFID) sensor, or a forward looking radar sensor.

4. The method of claim 1, wherein receiving the guideway data further comprises:
   receiving the guideway data from a database that contains information describing track segments and the set of coordinates of the flight path data.

5. The method of claim 1, wherein the magnetic suspension system includes a plurality of levitation generators, wherein adjusting the position of the vehicle relative to the track segment further comprises:
   changing an angle of at least one levitation generator of the plurality of levitation generators relative to the track segment to minimize the amount of deviation in the at least one dimension in the 3-D space.

6. The method of claim 5, wherein adjusting the position of the vehicle relative to the track segment further comprises:
   changing a levitation force at one or more levitation generators to minimize the amount of deviation in the at least one dimension in the 3-D space.

7. The method of claim 5, further comprising:
   independently changing the angle of each levitation generator of the plurality of levitation generators.

8. The method of claim 1, further comprising:
   adjusting, at a drive generator, a drive force to change a velocity of the vehicle relative to the track segment to minimize the amount of deviation in at least one dimension in the 3-D space.

9. The method of claim 8, further comprising:
   determining the velocity of the vehicle relative to the track segment based on one of an optical sensor, an encoder, or radar sensors.

10. The method of claim 1, wherein determining the amount of deviation further comprises:
    determining a difference between the one or more coordinates of the flight path data and a current position of the vehicle relative to the track segment.

11. The method of claim 10, further comprising:
    determining at least one of a pitch, roll, or yaw of the vehicle relative to the track segment based on the amount of deviation.

12. A system for guiding a vehicle over a flight path, the system comprising:
    a plurality of guideway sensors associated with a metallic track, the plurality of guideway sensors generate guideway data corresponding to one or more track segments disposed between two or more supports, wherein the guideway data includes a length of the track segment;
    a plurality of levitation generators that provide lift to a vehicle relative to a track segment; and
    a controller comprising at least one processor unit configured to:
    receive guideway data generated by one or more guideway sensors associated with a metallic track, the guideway data including information corresponding to a track segment disposed between two or more supports;
    receive flight path data for the vehicle, the flight path data representing a set of coordinates in three-dimensional (3-D) space;
        determine a deflection of the track segment in the 3-D space based at least on the length of the track segment and a velocity of the vehicle relative to the length of the track segment;
        determine an amount of deviation between one or more coordinates of the flight path data and a position of the vehicle based on the guideway data and the deflection of the track segment; and
        adjust one or more of the levitation generators to change the position of the vehicle relative to the track segment to minimize the amount of deviation in at least one dimension in the 3-D space.

13. The system of claim 12, further comprising:
    at least one drive generator that provides a drive force corresponding to a velocity of the vehicle relative to the track segment, wherein the processor unit is further configured to adjust the at least one drive generator to change the velocity of the vehicle relative to the track segment to minimize the amount of deviation in at least one dimension in the 3-D space.

14. The system of claim 12, wherein the processor unit is further configured to change an angle of at least one levitation generator relative to the track segment to minimize the amount of deviation in the at least one dimension in the 3-D space.

15. The system of claim 14, wherein the processor unit is further configured to change a levitation force at one or more levitation generators to minimize the amount of deviation in the at least one dimension in the 3-D space.

16. The system of claim 14, wherein the processor unit is further configured to independently change the angle of each levitation generator of the plurality of levitation generators.

17. A tangible, non-transitory, computer-readable media having instructions encoded thereon, the instructions, when executed by a processor, are operable to:
- receive guideway data generated by one or more guideway sensors associated with a metallic track, the guideway data including information corresponding to a track segment disposed between two or more supports, wherein the guideway data includes a length of the track segment;
- receive flight path data for a vehicle configured to traverse the track segment, the flight path data representing a set of coordinates in three-dimensional (3-D) space;
- determine an amount of deviation between one or more coordinates of the flight path data and a position of the vehicle based on the guideway data;
- instruct a magnetic suspension system to adjust the position of the vehicle relative to the track segment to minimize the amount of deviation in at least one dimension in the 3-D space;
- determine a deflection of the track segment in the 3-D space based at least on the length of the track segment and a velocity of the vehicle relative to the length of the track segment; and
- determine the amount of deviation between the one or more coordinates of the flight path data and the position of the vehicle based on the deflection of the track segment.

18. A tangible, non-transitory, computer-readable media of claim 17, wherein the instructions, when executed by the processor, are further operable to:
- adjust an angle of at least one levitation generator of the vehicle relative to the track segment to minimize the amount of deviation in at least one dimension in the 3-D space; and adjust a drive force produced by a drive generator to change a velocity of the vehicle relative to the track segment to minimize the amount of deviation in the at least one dimension in the 3-D space.

* * * * *